United States Patent [19]

Mori et al.

[11] Patent Number: 5,128,380

[45] Date of Patent: Jul. 7, 1992

[54] METHOD FOR PRODUCING EXPANDABLE THERMOPLASTIC POLYMER PARTICLES

[75] Inventors: Kiyoshi Mori, Kakogawa; Toshiaki Sugita, Akashi; Yoshiyuki Hashiguchi, Kobe; Masakichi Kishi, Himeji, all of Japan

[73] Assignee: Kanegafuchi Kagaku Kogyo Kabushiki Kaisha, Osaka, Japan

[21] Appl. No.: 513,660

[22] Filed: Apr. 24, 1990

[30] Foreign Application Priority Data

Apr. 28, 1989 [JP] Japan .................................. 1-109584

[51] Int. Cl.$^5$ .............................................. C08J 9/18
[52] U.S. Cl. ...................................... 521/60; 521/56; 521/59
[58] Field of Search ........................... 521/56, 60, 59

[56] References Cited

U.S. PATENT DOCUMENTS

| | | | |
|---|---|---|---|
| 3,389,097 | 6/1968 | Ingram | 260/2.5 |
| 3,960,787 | 6/1976 | Isukamoto et al. | 521/60 |
| 4,173,688 | 11/1979 | Saito | 521/56 |
| 4,174,425 | 11/1979 | Saito | 521/56 |
| 4,333,969 | 6/1982 | Wright | 427/222 |

FOREIGN PATENT DOCUMENTS

| | | |
|---|---|---|
| 48-48588 | 7/1973 | Japan . |
| 49-2994 | 1/1974 | Japan . |
| 57-102905 | 6/1982 | Japan . |
| 57-128708 | 8/1982 | Japan . |
| 59-161441 | 9/1984 | Japan . |
| 59-161442 | 9/1984 | Japan . |
| 62-109807 | 5/1987 | Japan . |
| 62-288608 | 12/1987 | Japan . |

*Primary Examiner*—Morton Foelak
*Attorney, Agent, or Firm*—Armstrong & Kubovcik

[57] ABSTRACT

The present invention provides a method for producing expandable thermoplastic polymer particles which comprises conducting polymerization by adding a polymerizable monomer either continuously or intermittently to thermoplastic polymer particles having a uniform particle size suspended in water, the improvement wherein an amide compound is added when the added amount of the polymerizable monomer is not more than one half of the total amount to be added in the course of polymerization and resulting polymer particles are impregnated with an easily volatile blowing agent after completion of addition of the amide compound and the polymerizable monomer. According to the present invention, expandable thermoplastic particles which are capable of giving cells, fine and uniform in size, are obtainable even by expanding immediately after production without any aging period.

10 Claims, 1 Drawing Sheet

METHOD FOR PRODUCING EXPANDABLE THERMOPLASTIC POLYMER PARTICLES

BACKGROUND OF THE INVENTION

1. Field of the Invention

The present invention relates to a method for producing expandable thermoplastic polymer particles at a high yield, particularly expandable styrene type resin particles, giving cells formed inside the expanded particles which are fine and uniform in size even when expansion is carried out immediately after production of the particles.

2. Description of the Prior Art

Expandable thermoplastic polymer particles release an easily volatile blowing agent (hereinafter referred to as "blowing agent") contained therein to thereby lose its expanding capability readily, and the time required therefor becomes shorter with particles smaller in size. When a mixture of particles different in size is expanded, a difference in expansion ratio results according to the particle size and the strength of foamed articles identical in density is lowered with increasing proportion of large-sized particles. When large-sized pre-expanded particles are included, it gives rise to such problems as deterioration of the filling property into a mold and difficulty to obtain a good foamed article. Furthermore, a foamed article obtained from particles broad in particle size distribution is different in the size of expanded particles, hence not favorable in external aesthetic beauty. From such a viewpoint, it is preferred to take those narrow in particle size as expandable thermoplastic polymer particles for producing a foamed article.

For obtaining expandable thermoplastic polymer particles, there have hitherto been known methods roughly divided into the following categories:

(1) A method for obtaining particles of a given size by suspension polymerization of a polymerizable monomer, then impregnating the resulting polymer with a blowing agent and finally sifting it.

(2) method for suspension polymerizing a polymerizable monomer, then sifting the resulting polymer and finally impregnating only the particles of a given range of size with a blowing agent.

(3) A method for pelletizing a polymer and then impregnating the resulting pellets of a given size with a blowing agent.

(4) The so-called seed polymerization method in which a polymerizable monomer is suspension polymerized, then only particles of a given size are taken out and suspended in water, subsequently a polymerizable monomer is added either continuously or intermittently for further polymerization, then the grown particles are impregnated with a blowing agent.

As to the method (1), however, all particles are impregnated with the blowing agent, and hence, the particles containing the blowing agent but not suited for intended uses, because of their particle size being outside the intended range have to be treated for some other use, which becomes a heavier burden with increasing scale of production.

As to the method (2), since the polymer particles are used after sifting, the process of producing polymer particles and that of impregnating them with the blowing agent are necessarily separated, which results in complication of the process and also increased cost. Further, by this method, too, like the method (1), the burden of treating the particles off the desired range of the particle size for some other suitable use cannot be avoided, either.

In the method (3), too, the pelletizing step is required in addition to the polymer producing step and the step of impregnation with the blowing agent, the overall process being thus highly complicated. The cells formed by expanding the expandable particles are extremely small and it is difficult to obtain a good foamed article.

In order to eliminate the aforementioned defects, the method (4) disclosed in Japanese Patent Publication No. 2994/1974, the so-called seed polymerization method, is proposed. By this method, production of expandable thermoplastic polymer particles substantially in the desired particle size is feasible. Meanwhile, in any of the methods (1)–(4), the number of cells formed inside the individual particles is small when the obtained particles are expanded immediately after production to produce pre-expanded particles and, moreover, such cells are bound to be coarse and large. In order to make these cells uniform and fine, it was a usual practice to provide an aging period of 1-3 weeks but this method had a drawback of the blowing agent being lost in the aging period, thus resulting in lowering of expanding capability. As to the producing methods (1), (2) and the like, the possibility of shortening or omitting the aging period by conducting polymerization with addition of various amide compounds simultaneously with a monomer is disclosed in Japanese Laid-open Publication Nos. 48588/1973, 161441/1984, 161442/1984, 166538/1984 and 168037/1984.

Notwithstanding, by the (4) seed polymerization method in which polymerization reaction proceeds at a high conversion ratio, it has been considered difficult to shorten the aging period by the use of any amide compound since particles formed at such a high conversion ratio are not easily impregnated with any amide compound to the interior thereof, hence such possibility has not been studied yet.

SUMMARY OF THE INVENTION

It is a primary object of the present invention to provide a method for producing expandable thermoplastic polymer particles giving the cells formed inside each expanded particle which are fine and uniform in size even if expansion is carried out immediately after production thereof.

Other objects and advantages of the present invention will become apparent to those skilled in the art from reading of the description below.

The present inventors have found out that the aforementioned objects can be accomplished through addition of an amide compound in a special way and thereby completed the present invention.

DETAILED DESCRIPTION OF THE INVENTION

Figure 1:
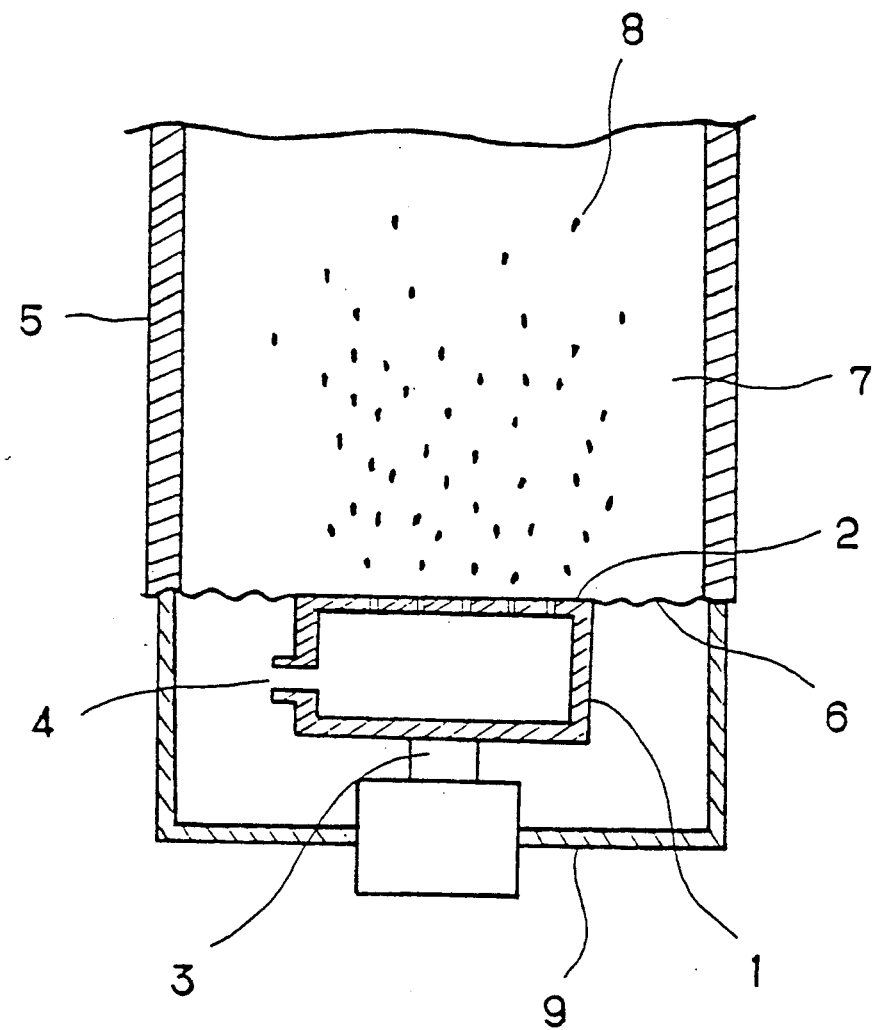
FIG. 1 is a diagrammatic view of a liquid droplet generator for producing seed particles used in Preparative Example 1.

The present invention relates to a method for producing expandable thermoplastic polymer particles characterized in that an amide compound is added when the added amount of a polymerizable monomer is not more than one half of the total amount to be added in the course of adding the polymerizable monomer either continuously or intermittently to thermoplastic polymer particles uniform in size suspended in water and that the resulting polymer particles are impregnated with a blowing agent after completion of addition of the amide compound and the polymerizable monomer.

The particles of a thermoplastic polymer used in the present invention are granules of a generally known thermoplastic resin. As such particles, there are included, among others, homopolymer particles or copolymer particles of styrene, styrene derivatives such as α-methylstyrene, paramethylstyrene, t-butylstyrene and chlorostyrene, acrylic or methacrylic esters such as methyl acrylate, butyl acrylate, methyl methacrylate, ethyl methacrylate and cetyl methacrylate, or acrylonitrile, dimethyl fumarate, ethyl fumarate, or pellets of polyethylene, polypropylene and the like.

It is significant for improvement of expandable styrene type resin particles to employ particles of a styrene type polymer comprising styrene as the main ingredient.

The size of the aforementioned particles is preferred to be as uniform as possible, for it is reflected on the particle size of the resultant expandable thermoplastic polymer particles. As such thermoplastic polymer particles, preferred are a group of particles substantially uniform in particle size with not less than 90% by weight, preferably not less than 99% by weight, of the particles being 0.9-1.1 times of the volumetric means particle size of the whole particles suspended in water. For easily obtaining such particles uniform in particle size, there is known a method in which a polymerizable monomer is dispersed in an aqueous medium as a group of liquid droplets uniform in size by passing them through a nozzle under a condition of regular vibration and such droplets are polymerized without aggregation or further dispersion. Alternatively, it is also possible to obtain such particles by classifying polymer particles obtained by an ordinary suspension polymerization method. As to the amount of such particles used, it is preferred to be 1-60% by weight, more preferably 5-30% by weight, of the whole amount of polymer formed upon completion of polymerization. The amount of less than 1% by weight is not preferable, because the proportion of the added monomer to be homo-polymerized in powder form without being used for growth of seed particles increases. If, on the other hand, the amount is too much, the ratio of the size of the grown particles to the seed particles becomes small, which is disadvantageous economically.

The polymerizable monomer added for polymerization in the present invention is any monomer used in an ordinary suspension polymerization and as such monomer, there are included, among others, styrene, styrene derivatives such as α-methylstyrene, paramethylstyrene, t-butylstyrene and chlorostyrene, acrylic and methacrylic esters such as methyl acrylate, butyl acrylate, methyl methacrylate, ethyl methacrylate and cetyl methacrylate and, further, acrylonitrile, dimethyl fumarate, ethyl fumarate and the like, these monomers being usable either along or in combination of two or more. Also, bifunctional monomers such as divinyl benzene and alkylene glycol dimethacrylate can be used in combination with the above.

As polymerization initiators for the aforementioned monomers in the present invention, radical generation-type polymerization initiators generally used in the production of thermoplastic polymers are usable. Typical examples are organic oxides such as benzoyl peroxide, lauroyl peroxide, t-butylperbenzoate, t-butylperpivarate, t-butylperoxy isopropylcarbonate, t-butylperoxy acetate, 2,2-di-t-butylperoxy butane, t-butylperoxy 3,3,5-trimethylhexanoate, di-t-butylperoxy hexahydroterephthalate and 3,3,5-trimethyl cyclohexane, and azo compounds such as azobisisobutylonitrile and azobisdimethylvaleronitrile.

Such polymerization initiators are usable either alone or in combination of two or more, but, for proper adjustment of the molecular weight and reduction of the residual amount of monomer, it is effective to use two or more of polymerization initiators different in decomposition temperature.

Meanwhile, the amide compounds used in the method of the present invention are the so-called nucleating agents and even if the expandable thermoplastic polymer particles produced with the use thereof are heated for expanding after the production, expanded particles having uniform and fine cells therein are obtainable. As amide compounds having such effects, there are included fatty acid bisamides, aliphatic dicarboxylic acid diamides and fatty acid monoamides represented by the following general formulae (I), (II) and (III);

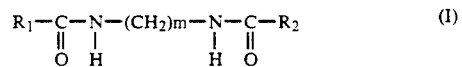

(where $R_1$ and $R_2$ are alkyl groups and m is an integer of 1-6.)

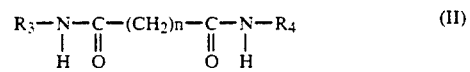

(where $R_3$ and $R_4$ are alkyl groups and n is an integer of 1-6.)

(where $R_5$ is alkyl group and $R_6$ is hydrogen atom or alkyl group).

As these amide compounds, there are included, among others, fatty acid bisamides such as methylene bislauric acid amide, methylene bisstearic acid amide, ethylene bisstearic acid amide, hexamethylene bispalmitic acid amide and ethylene bisoleic acid amide, aliphatic dicarboxylic acid diamides such as N,N'-dioleyl adipic acid amide, N,N'-distearyl adipic acid amide, N,N'-dilauryl adipic acid amide, N,N'-dipalmityl adipic acid amide, N,N'-dibehenyl adipic acid amide, N,N'-dioleyl sebacic acid amide and N,N'-distearyl sebacic acid amide, and fatty acid monoamides such as N-lauryl stearic acid amide, N-palmityl stearic acid amide, N-oleyl stearic acid amide, N-stearyl stearic acid amide, N-behenyl stearic acid amide, N-lauryl oleic acid amide, N-palmityl oleic acid amide, N-stearyl oleic acid amide, oleic acid amide, erucic acid amide, palmitic acid amide and stearic acid amide.

These compounds may be used either alone or in combination of two or more. Of the above-mentioned compounds, ethylene bisstearic acid amide in particular is markedly effective as a nucleating agent. The preferred amount of such amide compound is 0.05-1.0% by weight, more preferably 0.1–1.0% by weight, of the thermoplastic polymer particles after completion of polymerization but before impregnation with a blowing agent. Since, in the seed polymerization method, a polymerization reaction generally proceeds at a high conversion ratio with the amount of an unconverted monomer in the polymer particles being small, the efficiency of impregnation with the amide compound is low, hence the required amount of the amide compound is more than that in the ordinary suspension polymerization method in which an amide compound is added in an early stage together with a monomer. The required amount of the amide compound in the present invention is not less than 0.05% by weight. Even if its amount added is in excess of 1.0% by weight, however, no further improvement of the cell forming effect can be expected.

Since the polymerization reaction in the seed polymerization method proceeds at a high conversion ratio, the polymer particles are not easily impregnated with the amide compound and a difference in concentrations between the surface layer and the core portion of a particle is likely to occur. Such ununiformity is bound to result in a difference in cell sizes between the surface and the interior of the expanded particles, which adversely affects moldability as well as the physical properties thereof.

For solving these problems, it is effective (1) to add the amide compound as early as possible, at the latest before the amount of the monomer added is not in excess of one half of the whole amount to be added, and preferably before the start of polymerization, (2) to use a fine grade of amide compound of not more than 100 μm in particle size, (3) to keep the the polymerization at a temperature of not lower than the melting point of the amide compound for a period of not less than 30 minutes after completion of addition of the polymerizable monomer.

The suspending agent used in the method of the present invention is an ordinary one generally used, for example, water-soluble high molecular compounds such as polyvinyl alcohol, methyl cellulose, polyacryl amide and polyvinyl pyrrolidone or water-scarcely-soluble inorganic substances such as tribasic calcium phosphate and magnesium pyrophosphate. When a water-scarcely-soluble inorganic substance is used, the suspension stabilizing effect can be improved by additional use of an anionic surfactant such as sodium dodecyl benzene sulfonate. The use of a water-soluble high molecular compound and a scarcely-soluble-inorganic substance in combination is also effective.

The blowing agent used in the present invention is an easily volatile organic compound which is normally liquid or normally gaseous but liquid under pressure and of which boiling point is not higher than the softening point of the polymer. As such blowing agents, there are included, among others, aliphatic hydrocarbons such as propane, butane, pentane and hexane, cycloaliphatic hydrocarbons such as cyclobutane, cyclopentane and cyclohexane, and halogenated hydrocarbons such as methyl chloride, dichlorodifluoromethane and dichlorotetrafluoroethane.

Such blowing agents can be used either alone or in combination of two or more, and the timing of addition is preferable after completion of addition of the amide compound.

According to the present invention, it is by no means prohibited to use, besides the aforementioned materials, any substance generally used in the production of expandable thermoplastic polymer particles such as plasticizers, solvents and flame retarding agents.

As mentioned above, it is possible according to the method of the present invention to produce expandable thermoplastic polymer particles in substantially desired particle size and uniform and fine cells are obtainable even if expansion is carried out immediately after production of the particles.

The present invention will be explained in greater detail by way of examples and comparison examples, but it is to be understood that the present invention is by no means limited thereto.

PREPARATIVE EXAMPLE 1

Production of Seed Particles 3 liters of an aqueous dispersion medium with 3000 ppm of tribasic calcium phosphate in fine powder form, 50 ppm of polyvinyl alcohol ("Gohsenol GH-20": Trade name of Nihon Gohsei Kagaku Kogyo K.K.) and 50 ppm of sodium α-olefin sulfonate suspended therein was poured into a 5-liter reactor with a paddle type agitator, having an outlet at the bottom and an inlet at the top and further having a circulating line connecting the outlet with the inlet via a centrifugal pump.

Then, benzoyl peroxide was dissolved in styrene monomer and the resulting solution was supplied at a rate of 0.8 liter/hr to a liquid droplet generator with 5 nozzles having a diameter of 0.2 mm as shown in FIG. 1, to form liquid droplets in the aqueous dispersion medium by means of mechanical vibration of 500 Hz and the formed liquid droplets were introduced into the aforementioned 5-liter reactor through a liquid droplet inlet pipe by means of buoyancy. Formation of the liquid droplets was stopped after introduction of 500 g of liquid droplets, the dispersion in the reactor was heated to 90° C. and polymerization was conducted for 2 hours. Then, circulation by pump was stopped and the agitator was driven at a speed of 60 rpm to continue polymerization for 3 hours at 90° C. Upon completion of polymerization, the slurry in the reactor was cooled and a group of polymer particles was obtained after dehydration and drying. The measured particle size distribution was 28–32 mesh (0.59–0.50 mm), the mean particle size was 0.53 mm and the yield was 99% by weight, the resulting particles being spherical and uniform in particle size. The group of particles obtained is hereinafter called seed particles.

PREPARATIVE EXAMPLE 2

Production of Seed Particles 1.8 liters of deionized water, 7.2 g of tribasic calcium phosphate and 6 ml of 1% by weight aqueous solution of sodium α-olefin sulfonate were poured into a 5-liter flask equipped with an agitator, and 1.8 kg of styrene monomer containing 0.3% by weight of benzoyl peroxide were added thereto under agitating and polymerization was conducted for 5 hours at 90° C. The resulting polymer was cooled and the result of particle size measurement after dehydration and drying was as shown in Table 1.

TABLE 1

| Mesh | 16 on | 16-20 | 20-24 | 24-28 | 28-32 | 32-35 | 35-42 | 42 pass |
|---|---|---|---|---|---|---|---|---|
| % by wt. | 2 | 4 | 9 | 21 | 29 | 23 | 5 | 7 |

The result shows that if particles of 28-32 mesh (0.59-0.50 mm) are separated from those particles by sifting and used as seed particles, the yield is as low as 29% by weight.

EXAMPLE 1

1.8 liters of deionized water, 7.2 g of tribasic calcium phosphate, 20 ml of 1% by weight aqueous solution of sodium α-olefin sulfonate, 360 g of seed particles and 7.2 g of ethylene bisstearic acid amide powder with 5-15 μm in particle size were charged into a 5-liter flask with an agitator and the temperature of the resulting dispersion in the reactor was raised to 90° C. under agitating. Then, a solution prepared by dissolving 12.6 g of coconut oil in 1,390 g of styrene monomer, and an emulsion prepared by dissolving 5 g of benzoyl peroxide and 3.6 g of 1,1-di-t-butylperoxy 3,3,5-trimethyl cyclohexane in 50 g of styrene monomer and then having this solution emulsified in 50 g of 0.2% by weight aqueous solution of hydroxyethyl cellulose were charged into the reactor at the rates shown in Table 2 respectively, polymerization being allowed to proceed at 90° C.

TABLE 2

| Condition | Time elapsed (hr) | | |
|---|---|---|---|
| | 0-2 | 2-4 | 4-5 |
| Charging rate of styrene monomer solution (g/hr) | 160 | 303 | 465 |
| Charging rate of emulsion of polymerization initiator (g/hr) | 13 | 25 | 32 |

32 g of cyclohexane and 126 g of butane were added as blowing agents immediately after completion of charging of the styrene monomer solution and the emulsion of the polymerization initiator, then the temperature was raised to 115° C. and polymerization and impregnation with the blowing agents were carried out for 3 hours at this temperature. After cooling, the obtained particles of the expandable polystyrene particles were taken out, dehydrated and dried, and pre-expansion (expansion ratio : 60-fold) was immediately carried out by heating with steam. The cells inside the individual pre-expanded particles were uniform and fine from the surface layer to the core. These pre-expanded particles were aged for 1 day and were expansion-molded by the molding machine "Pearlstar-90" (Trade name of Toyo Kikai Kinzoku K.K.) having a mold for foamed article, 45 cm long, 30 cm wide and 2 cm thick. The density of the foamed article obtained was 0.019 g/cm³ and looked fine with the particles forming the surface being quite uniform in size.

COMPARISON EXAMPLE 1

Expandable polystyrene particles were obtained in the same way as described in Example 1 except that ethylene bisstearic acid amide was not used. The cells inside the pre-expanded particles obtained by pre-expansion immediately after production thereof were markedly ununiform and coarse and the cells were still ununiform even when expansion-molding was carried out after aging for 2 days at 15° C.

EXAMPLES 2-11

Expandable polystyrene particles were obtained in the same way as described in Example 1 except that various amide compounds shown in Table 3 were used in the quantities also shown in the same table, instead of 7.2 g of ethylene bisstearic acid amide powder. The results of evaluation were as shown also in Table 3.

REFERENCE EXAMPLE 1

1.8 liters of deionized water, 2.7 g of tribasic calcium phosphate, 6 ml of 1% by weight aqueous solution of sodium α-olefin sulfonate and 0.9 g of granular ethylene bisstearic acid amide ("Armowax EBS bead": Trade name of Lion Yushi K.K.) were charged into a 5-liter reactor equipped with an agitator, 1.8 kg of styrene monomer containing 0.22% by weight of benzoyl peroxide and 0.15% by weight of 1-di-t-butylperoxy 3,3,5-trimethyl cyclohexane were added thereto, the temperature was raised to 90° C. and after polymerization for 5 hours at this temperature, 32 g of cyclohexane and 126 g of butane were added as blowing agents, and polymerization and impregnation with the blowing agents were carried out for 3 hours at 115° C. The expandable polystyrene particles were evaluated in the same way as described in Example 1 and the result was as shown in Table 3. It is understandable that in such an ordinary polymerization method the amide compound can be added to the polymerization system prior to the start of polymerization, hence, uniform and fine cells being easily obtainable.

EXAMPLES 12-14

After charging of the styrene monomer solution and the emulsified polymerization initiator, the temperature was raised to 130° C. or 150° C. and then lowered to 90° C. after keeping 1 or 2 hours at either temperature, and in the same way as described in Example 3, the blowing agent was then added, and polymerization and impregnation with the blowing agent were carried out for 3 hours at 115° C. The expandable polystyrene particles were evaluated in the same way as described in Example 1 and the results were as shown in Table 4. The melting point of ethylene bisstearic acid amide is 145° C. and it is to be seen that the state of cells is improved by heating to the melting point or above.

EXAMPLES 15, 16

Granular ethylene bisstearic acid amide ("Armowax EBS bead": Trade name of Lion Yushi K.K.) classified to 250-350 μm and 1000-1,190 μm by sifting were used instead of the ethylene bisstearic acid amide powder in Example 1 and the obtained expandable polystyrene particles were evaluated. The results were as shown in Table 5. It will be understood that the cells become more uniform with decreasing particle size of ethylene bisstearic acid amide.

EXAMPLES 17, 18 AND COMPARISON EXAMPLES 2, 3

Expandable polystyrene particles were obtained in the same way as described in Example 2 except that the timing of adding ethylene bisstearic amide was varied as shown in Table 6. The results of its evaluation are shown also in Table 6. It is to be seen that when aging is omitted, the better result is obtained when addition of ethylene bisstearic acid amide is done earlier.

As mentioned above, in the production of expandable thermoplastic polymer particles by the seed polymerization method, too, expandable thermoplastic particles which are capable of giving uniform and fine cells are obtainable if a proper amide compound is used as nucleating agent with proper selection of timing of adding it.

TABLE 5

| | Particle size of ethylene bisstearic acid amide (μm) | Cells of pre-expanded particles |
|---|---|---|
| Example 1 | 5–15 | No variation of cell size |
| 15 | 250–350 | Variation of cell size noticeable |
| 16 | 1,000–1,190 | Marked variation of cell size noticeable |

TABLE 6

| | Timing of adding amide compound | | Cells of pre-expanded particles | | |
|---|---|---|---|---|---|
| | Time from starting addition of polymerizable monomer (hr) | Proportion of added amount of polymerizable monomer (%) | Without Aging | Aging (1 day, 15° C.) | Aging (2 days, 15° C.) |
| Example 2 | 0 | 0 | B–A | B | B |
| 17 | 1 | 12 | B | B–A | B |
| 18 | 3 | 45 | B–C | B | A |
| Comp. Example 2 | 4 | 67 | D | C | B–C |
| 3 | 5 | 100 | D | D | C |

TABLE 3

| | Amide compounds | | Cells of pre-expanded particles | | |
|---|---|---|---|---|---|
| | Kind | Amount (Parts by wt.) | Without aging | Aging (1 day, 15° C.) | Aging (2 days, 15° C.) |
| Example 1 | Ethylene bisstearic acid amide | 0.40 | A | A | A |
| 2 | Ethylene bisstearic acid amide | 0.20 | B–A | A | A |
| 3 | Ethylene bisstearic acid amide | 0.10 | B–C | B | A |
| 4 | Ethylene bisstearic acid amide | 0.07 | C | B–C | B |
| 5 | Methylene bisstearic acid amide | 0.40 | A | A | A |
| 6 | Methylene bisstearic acid amide | 0.20 | B | B–A | A |
| 7 | N,N'-distearyl sebasic acid amide | 0.40 | B–A | A | A |
| 8 | N,N'-distearyl sebasic acid amide | 0.20 | B–C | C | A |
| 9 | N-stearyl stearic acid amide | 0.20 | B | B–A | A |
| 10 | N-oleyl stearic acid amide | 0.20 | B | B–A | A |
| 11 | Oleic acid amide | 0.20 | B–C | B | B |
| Comp. Example 1 | None | — | D | D | C |
| Ref. Example 1 | Ethylene bisstearic acid amide | 0.05 | B | A | A |

Parts by weight: The total weight of seed particles and added monomer is taken as 100 parts by weight.
Cell condition: Uniform and fine to ununiform and coarse in the order of A, A–B, B–C, C and D.

TABLE 4

| | Treating conditions | | Cells of pre-expanded particles | | |
|---|---|---|---|---|---|
| | Temperature (°C.) | Time (hr) | Without aging | Aging (1 day, 15° C.) | Aging (2 days, 15° C.) |
| Example 3 | — | — | B–C | B | A |
| 12 | 130 | 2 | B–A | A | A |
| 13 | 150 | 2 | A | A | A |
| 14 | 150 | 1 | A | A | A |

What is claimed is:

1. A method for producing expandable thermoplastic polymer particles which comprises:
   (1) adding thermoplastic polymer particles having a uniform size to water to form a suspension of seed particles,
   (2) adding either continuously or intermittently to said suspension of seed particles a monomer which is polymerizable to form said thermoplastic polymer, and polymerizing the added monomer in the resulting polymerization system, adding an amide compound to the polymerization system when the amount of the monomer added to the polymerization system is not more than one half of the total amount to be added in the course of polymerization, and (3) impregnating the resulting polymer particles with an easily volatile blowing agent after completion of addition of the amide compound and the monomer.

2. A method of claim 1, wherein the amide compound is at least one compound selected from the group consisting of fatty acid bisamides, aliphatic dicarboxylic acid diamides and fatty acid monoamides represented by the following general formulae (I), (II) and (III);

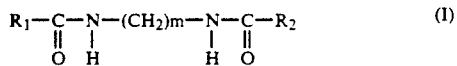

(where $R_1$ and $R_2$ are alkyl groups and m is an integer of 1-6)

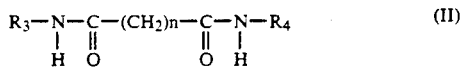

(where $R_3$ and $R_4$ are alkyl groups and n is an integer of 1-6)

(where $R_5$ is an alkyl group and $R_6$ is hydrogen atom or alkyl group).

3. A method of claim 1, wherein the amide compound is ethylene bisstearic acid amide.

4. A method of any one of claims 1 to 3, wherein the thermoplastic polymer particles are styrene type polymer particles and the polymerizable monomer is a styrene type monomer or a mixture of the styrene type monomer as a main ingredient with other monomers polymerizable therewith.

5. A method of any one of claims 1 to 3, wherein the added amount of the amide compound is 0.05-1.0% by weight of the thermoplastic polymer particles after completion of polymerization but before impregnation with the easily volatile blowing agent.

6. A method of any one of claims 1 to 3, wherein the temperature of the polymerization system is kept for a period of not less than 30 minutes at a temperature of not lower than the melting point of the amide compound after completion of addition of the polymerizable monomer.

7. A method of any one of claims 1 to 3, wherein the particle size of said amide compound is not more than 100 μm.

8. A method of any one of claims 1 to 3, wherein the amount of said thermoplastic polymer particles prior to the start of polymerization is 1-60% by weight of the whole amount of the polymer upon completion of polymerization.

9. A method of any one of claims 1 to 3, wherein not less than 90% by weight of the thermoplastic polymer particles prior to the start of polymerization have a particle size 0.9-1.1 times of the volumetric mean particle size of the whole particles suspended in water.

10. A method of any one of claims 1 to 3, wherein the thermoplastic polymer particles prior to the start of polymerization are polymerized particles obtained by passing said polymerizable monomer through a nozzle under a condition of regular vibration to have it dispersed in an aqueous medium as liquid droplets having a uniform size without aggregation or further dispersion.

* * * * *